United States Patent Office

3,114,728
Patented Dec. 17, 1963

3,114,728
BINARY BLENDS OF POLYVINYL FORMAL AND ETHYLENE VINYLENE CARBONATE COPOLYMER AND PROCESSES FOR MAKING THE SAME
James A. Herbig and Ival O. Salyer, Dayton, Ohio, assignors to Monsanto Chemical Company, St. Louis, Mo., a corporation of Delaware
No Drawing. Filed July 21, 1960, Ser. No. 44,274
9 Claims. (Cl. 260—45.5)

This invention relates to polyvinyl acetal resins. In one aspect, this invention relates to polyvinyl formal compositions comprising binary blends of polyvinyl formal and an ethylene/vinylene carbonate copolymer. In another aspect, this invention relates to methods for making binary blends of polyvinyl formal and ethylene/vinylene carbonate copolymer.

Polyvinyl formal is a thermoplastic resin which is difficult to injection mold successfully because rather high molding temperatures are required which result in significant thermal degradation of the polymer. Also, the physical appearance of articles manufactured from polyvinyl formal at elevated temperatures is often less than is desired because such articles are discolored and lacking in good luster and high surface gloss. Plasticizers have been used to improve the flow characteristics of the polyvinyl formal polymer, but the use of a plasticizer must be kept to a minimum in order to preserve high dimensional stability in the product. Therefore, there is need for improvement in the processing characteristics of the polyvinyl formal resins.

We have discovered that binary blends of polyvinyl formal resin with ethylene/vinylene carbonate copolymer can be formed and that the resulting binary blends have improved properties not possessed by the polyvinyl formal resin.

An object of this invention is to provide improved polyvinyl formal compositions.

Another object of this invention is to provide binary blend compositions of polyvinyl formal resin and ethylene/vinylene carbonate copolymer.

Another object of this invention is to provide a method for improving the processability of polyvinyl formal resin compositions.

Another object of this invention is to provide a method for lowering the molding temperature of polyvinyl formal resin compositions without detrimental effect on the physical properties and dimensional stability of the compositions.

Other aspects, objects and advantages of this invention will be apparent from a consideration of the accompanying disclosure and the appended claims.

In accordance with this invention, improved polyvinyl formal resin compositions are made by incorporating small amounts of ethylene/vinylene carbonate copolymer in said polyvinyl formal resin to form a binary polyblend of the same. The novel binary polyblends of this invention comprise a major proportion of polyvinyl formal resin and a minor proportion of ethylene/vinylene carbonate copolymer. Ordinarily, the binary polyblends of this invention comprise from slightly less than 1% by weight ethylene/vinylene carbonate up to approximately 10% by weight ethylene/vinylene carbonate copolymer, with the remainder of the composition comprising polyvinyl formal resin and any included additives or stabilizers. Preferably, the polyvinyl formal polyblends of this invention contain from 99 wt. percent to 90 wt. percent polyvinyl formal and, correspondingly, from 1 wt. percent to 10 wt. percent ethylene/vinylene carbonate copolymer. Although the above stated proportions give useful as well as preferred compositions, other compositions outside the stated proportions can also be formed with fewer improvements in physical properties and with improvements to a lesser degree than are obtained in the above disclosed compositions.

The polyvinyl formal resins employed in the binary blends of this invention are commercially available materials which, as is well known to those skilled in the art, are produced by the condensation of formaldehyde with polyvinyl alcohol, or a partially hydrolyzed polyvinyl acetate. Preferably, the polyvinyl formal resin is produced by either the sequential or the simultaneous hydrolysis of polyvinyl acetate ester in a process which may comprise either alkaline hydrolysis of the polyvinyl acetate in a methanol or ethanol solution followed by acid condensation with the aldehyde as a separate step; acid hydrolysis of the polyvinyl acetate in acetic acid, dioxane methanol or an alcohol-ester solvent mixture followed by acid condensation with formaldehyde carried out simultaneously. The condensation can be carried out in either a solution, suspension, or emulsion polymerization system. Preferably, a strong mineral acid catalyst such as sulfuric acid, hydrochloric acid, phosphoric acid, benzene sulfonic acid or the like, is used as a catalyst. In commercial processes, neither the hydrolysis nor the condensation is carried to completion so that the final product usually contains some acetyl groups, some hydroxyl groups, as well as the formal groups. Binary polyblend compositions having very desirable properties are obtained with polyvinyl formals having a high degree of conversion of the acetate to the aldehyde and preferably the polyvinyl formal resin is characterized by at least about 70% nominal replacement of the original acetate groups by the respective aldehyde groups. Preferred polyvinyl formal resins for use in this invention include the "Formvar" resins available commercially. The commercial polyvinyl formal resins are usually identified by numbers corresponding to the approximate viscosity in centipoises of the parent polyvinyl acetate in benzene solution containing 86 g./liter from which the polyvinyl formal was produced; and the percentage hydrolysis or extent to which the acetate groups were replaced by hydroxyl and formal groups. Thus, a "Formvar" 15/95" resin indicates that the resin was derived from a polyvinyl acetate having a viscosity of 15 centipoises (for a benzene solution containing 86 g./liter), and that the reaction of the hydrolyzed polyvinyl acetate with formaldehyde was carried out to an extent of 95% replacement of OH by the aldehyde. Such a product would also contain from 5 to 6 wt. percent polyvinyl alcohol and from 9.5 to 13 wt. percent polyvinyl acetate. Other commercially available polyvinyl formal resins for use in this invention will be derived from polyvinyl acetates having viscosities from as low as 6 or 7 to as high as 16 or 17 expressed as above. Of course, these are merely preferred polyvinyl formal resins for use in this invention and other commercially available resins produced by the same or similar processes also can be used in this invention with less improvement.

The copolymers of ethylene/vinylene carbonate used in the novel binary polyblend compositions of this invention encompass ethylene/vinylene carbonate copolymer compositions containing ethylene and vinylene carbonate in all proportions. Most such copolymers will contain from 5 wt. percent to 99 wt. percent ethylene and correspondingly, from 95 wt. percent to 1 wt. percent vinylene carbonate, based upon the combined weights of the monomers entering into the copolymer. However, a copolymer containing the smallest significant quantity of vinylene carbonate, which may be 1% or less, or a copolymer containing the smallest significant quantity of ethylene, which may also be 1 wt. percent or less, can also be used in this invention. Preferably, the ethylene/vinylene carbonate copolymers used in this invention contain a major proportion by weight of ethylene and a minor proportion by weight of vinylene carbonate combined in the copolymer material. More specifically, preferred ethylene/vinylene carbonate copolymer compositions contain from 70 wt. percent to 99 wt. percent ethylene and, correspondingly, from 30 wt. percent to 1 wt. percent vinylene carbonate, based upon the combined weights of the monomers.

The ethylene-vinylene carbonate copolymer materials employed in the binary blends of this invention can be produced in a variety of methods as is well known to those skilled in the art. The monomeric material comprising ethylene and vinylene carbonate can be subjected to copolymerization at high pressure, preferably at least 5000 p.s.i., but more preferably at least 15,000 p.s.i., and pressures as high as 200,000 p.s.i. or even higher, depending upon equipment limitations. Usually, the copolymerization is effected at pressures in the range of from 20,000 to 40,000 p.s.i. The copolymerization of the ethylene and the vinylene carbonate is preferably carried out at temperatures within a fairly broad range, for example, from 35° C. to about 225° C. Preferably, a temperature within the range of from 50° C. to 100° C. is used. Preferably, the copolymerization of the ethylene and the vinylene carbonate is effected in the presence of catalysts of the free-radical promoting type, for example, the peroxide type polymerization catalyst and the azo type polymerization catalysts. Examples of such catalysts include diacetyl peroxide, ditertiary butyl peroxide, dimethylphenyl hydroperoxymethane, diazoaminobenzene, and the like, usually used in catalytic amounts within the range of 0.001% to 0.5% by weight of the comonomers. The copolymerization can also be effected in the presence of catalytic amounts of oxygen, preferably within the range of from 10 to 200 parts oxygen per million parts monomeric materials on a weight basis. If desired, the copolymerization can be effected under the influence of ionizing radiation of polymerization intensity, such as gamma rays produced by cobalt-60 or other radioactive substances. Additional information for the preparation of suitable ethylene/vinylene carbonate copolymers for use in this invention will be found in the patent literature, for example, in U.S. Patent No. 2,847,398.

The binary polyblend compositions of this invention are prepared by intimately admixing the polyvinyl formal resin and the ethylene/vinylene carbonate copolymer together. These components, which may be in any conventional form, may be mixed in any order, although usually the ethylene/vinylene carbonate copolymer is added to the polyvinyl formal resin since the ethylene/vinylene carbonate copolymer is usually used in a very minor amount. Preferably, the polyvinyl formal resin and the ethylene/vinylene carbonate copolymer are admixed together in a suitable container to form a rough admixture which is then further mixed on a conventional mixing machine of the type normally used for mixing rubber or plastics, e.g., a roll mill or a Banbury mixer. However, if desired, the polyvinyl formal resin can first be placed on the roll mill and, after a smooth rolling bank has formed in the nip of the rolls, the ethylene/vinylene carbonate copolymer added to the mixture. Regardless of the method by which the mixing of the ingredients is accomplished, it is necessary that the components be admixed together or worked under sufficient heat and pressure to insure sufficient dispersion of the ethylene/vinylene carbonate copolymer in the polyvinyl formal resin to form a completely homogeneous material. The temperature at which this working or mastication is conducted is not critical so long as the temperature is at least above that at which the polyvinyl formal resin fuses but below the temperature where decomposition takes place. Usually a temperature above about 300° F. to 325° F. and less than about 350° F. to 375° F. is sufficient to obtain an adequately intimate combination of the materials. If desired, suitable minor ingredients can also be included in the binary polyblends of this invention, including such ingredients as fillers, dyes, pigments, stabilizers, plasticizers, and the like.

The binary polyblend compositions obtained in this invention are particularly useful for injection molding; however, these compositions can also be produced in any of the other conventional forms. For example, these compositions can be calendered to form thin, smooth sheets, press molded, laminated, embossed, cut, drilled, or machined.

The advantages, desirability, and the usefulness of the present invention are illustrated by the following examples.

*Example 1*

A commercial polyvinyl formal resin, "Formvar 15/70," was subjected to testing as indicated hereinafter. The resin as received was cut into 1 to 2 inch squares for convenient feeding into an Abbe grinder for grinding into pellet size material which was then injection molded on a 1-ounce Watson-Stillman machine. The resin was injection molded at 141° C. at a pressure of 9000 p.s.i. to form tensile, flexural and impact specimens.

The physical properties of the injection molded polyvinyl formal resin were then determined to be as follows.

| | |
|---|---|
| Tensile strength at yield, p.s.i. | 9937 |
| Tensile elongation at yield, percent | 6.2 |
| Tensile strength at failure, p.s.i. | 8026 |
| Tensile elongation at failure, percent | 32.0 |
| Flexural strength, p.s.i. | 17,835 |
| Flexural deflection, inch | >0.80 |
| Clash-Berg data: | |
| $T_f$, ° C. | 61.3 |
| $T_{2000}$, ° C. | 77.4 |
| Stifflex range, ° C. | 16.1 |
| Notched impact strength, ft.-lb./in. | 0.67 |

Those properties were determined according to the standard ASTM procedures, more specifically, tensile strength and elongation were determined according to ASTM D-882-46, flexural strength and deflection were determined according to ASTM D-790-49T, the Clash-Berg data were determined according to ASTM D-1043-51, and the notched impact strength was determined by the Izod method as set forth in ASTM D-256-47T.

The injection molded product had very poor surface luster and delaminated severely upon flexing, resulting in layering or scaling of the product. Thus, polyvinyl formal resins cannot be injection molded at a temperature of 141° C. to produce a product having desirable surface properties. Further, higher molding temperatures could not be used without decomposing the product.

*Example 2*

In this example, a mechanical binary polyblend containing 97% by weight polyvinyl formal resin and 3% by weight ethylene/vinylene carbonate copolymer was prepared by mechanically milling an admixture of these materials on a 3 x 8 inch Thropp mill roll at a temperature of 174° C. for a period of time of 10 minutes. The ethylene/vinylene carbonate copolymer comprised 83% by weight ethylene and 17% by weight vinylene carbonate, based on the weight of monomers polymerized, and was prepared by polymerization at 20,000 p.s.i. pressure and a temperature of 80° C. for a period of 1.75 hours using α,α'-azodiisobutyronitrile as a catalyst. A rough mix was first prepared from the preformed materials in powdered or pelleted form in a stainless steel beaker and then this rough mix placed on the heated mill rolls and thoroughly homogenized. After milling, the material was sheeted and stripped from the mill rolls. The strips were cut into 1 to 2 inch squares, after sufficient cooling, for convenient feeding into an Abbe grinder for grinding into pellet size for injection molding on the 1-ounce Watson- Stillman machine. Injection molding of the materials was effected at 9000 p.s.i. and a temperature of 141° C. as used in the previous example for injection molding the polyvinyl formal resin.

The physical properties of this polyblend was then determined on the injection molded samples as follows.

| | |
|---|---|
| Tensile strength at yield, p.s.i. | 9416 |
| Tensile elongation at yield, percent | 6.6 |
| Tensile strength at failure, p.s.i. | 8126 |
| Tensile elongation at failure, percent | 20.1 |
| Flexural strength, p.s.i. | 16,611 |
| Flexural deflection, inch | >0.80 |
| Clash-Berg data: | |
| $T_f$, ° C. | 63.2 |
| $T_{2000}$, ° C. | 79.0 |
| Stifflex range, ° C. | 15.8 |
| Notched impact strength, ft.-lb./in. | 0.57 |

These properties were determined according to the ASTM procedures noted above.

The binary polyblend composition obtained in this example was a clear, almost transparent, product which had very good surface gloss and very high luster. Upon flexing, no delamination of the product occurred. Therefore, a polyblend of 97% polyvinyl formal and 3% ethylene/vinylene carbonate copolymer can be readily injection molded at a temperature of 141° C. to produce a product with good physical properties, whereas the injection molding of a polyvinyl formal resin not containing the ethylene/vinylene carbonate copolymer cannot be effected at this temperature under the same conditions to produce a similar product having good surface properties. In fact, polyvinyl formal must be injection molded at a temperature of approximately 170° C. in order to obtain a product having similar surface properties but that same product also has poor physical properties resulting from the attendant thermal degradation.

From the comparison of the physical properties in Example 1 and in Example 2 it will be noted that the physical properties of the polyvinyl formal-ethylene/vinylene carbonate polyblend compositions are very comparable to the polyvinyl formal resin not containing the ethylene/vinylene carbonate copolymer. Thus, the addition of 3 wt. percent ethylene/vinylene carbonate copolymer to a polyvinyl formal resin permits the resin to be injection molded at a temperature of 141° C. without significantly effecting the physical properties of the resin.

The binary blends of this invention are also useful in making compression molded articles as well as injection molded articles, and in addition, can also be used in other forms, for example, as films surface coatings and the like. These compositions can also be mixed with other materials, such as pigments, plasticizers, antioxidants, stabilizers, natural and synthetic resins, fillers, and the like, according to procedures well known to those skilled in the art.

Reasonable variation and modification of the invention as described are possible, the essence of which is that there have been provided binary polyblend compositions of polyvinyl formal resins comprising a major amount of a polyvinyl formal resin and a minor amount of an ethylene/vinylene carbonate copolymer, and methods for preparing the same.

We claim:

1. A polyvinyl formal polyblend composition comprising a major proportion of polyvinyl formal and a minor proportion of an ethylene/vinylene carbonate copolymer.

2. A polyvinyl formal polyblend composition comprising polyvinyl formal and from 1 wt. percent to 10 wt. percent of an ethylene/vinylene carbonate copolymer.

3. The composition of claim 2 wherein said ethylene/vinylene carbonate copolymer comprises a major proportion by weight of ethylene and a minor proportion by weight of vinylene carbonate.

4. A polyvinyl formal polyblend composition comprising polyvinyl formal and 3% by weight of an ethylene/vinylene carbonate copolymer comprising 83 wt. percent ethylene and 17 wt. percent vinylene carbonate, based on the weight of the comonomers polymerized.

5. A method for preparing a binary polyblend composition of polyvinyl formal and an ethylene/vinylene carbonate copolymer, said method comprising admixing a major proportion of said polyvinyl formal with a minor proportion of said ethylene/vinylene carbonate copolymer.

6. A method for preparing a binary polyblend composition of polyvinyl formal and an ethylene/vinylene carbonate copolymer, said method comprising mechanically admixing preformed polyvinyl formal with from 1% to 10% by weight of preformed ethylene-vinylene carbonate copolymer.

7. A method for preparing a binary polyblend composition of polyvinyl formal and an ethylene/vinylene carbonate copolymer, said method comprising mechanically admixing preformed polyvinyl formal with 3% by weight of preformed ethylene/vinylene carbonate copolymer.

8. A method of improving the processability of polyvinyl formal which comprises intimately admixing therewith a lesser amount of weight of an ethylene/vinylene carbonate copolymer comprising a major proportion by weight of ethylene and a minor proportion by weight of vinylene carbonate in said copolymer.

9. A polyvinyl formal polyblend composition comprising polyvinyl formal and from 1 wt. percent to 10 wt. percent of an ethylene/vinylene carbonate copolymer which comprises from 70 wt. percent to 99 wt. percent ethylene and from 30 wt. percent to 1 wt. percent vinylene carbonate, based on the weight of the comonomers present.

References Cited in the file of this patent

UNITED STATES PATENTS

| | | |
|---|---|---|
| 2,934,514 | Salyer et al. | Apr. 26, 1960 |
| 2,957,847 | Salyer et al. | Oct. 25, 1960 |